US008161089B1

(12) United States Patent
Mody

(10) Patent No.: US 8,161,089 B1
(45) Date of Patent: Apr. 17, 2012

(54) METHOD FOR DETECTING A BROAD CLASS OF SIGNALS IN GAUSSIAN NOISE USING HIGHER ORDER STATISTICS IN BOTH TIME AND FREQUENCY DOMAINS

(75) Inventor: Apurva N. Mody, Lowell, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1193 days.

(21) Appl. No.: 11/820,063

(22) Filed: Jun. 18, 2007

Related U.S. Application Data

(60) Provisional application No. 60/814,367, filed on Jun. 16, 2006.

(51) Int. Cl.
G06F 17/14 (2006.01)
G06F 15/00 (2006.01)
(52) U.S. Cl. ........................................ 708/404; 708/200
(58) Field of Classification Search .................. 708/404
See application file for complete search history.

(56) References Cited

U.S. PATENT DOCUMENTS

| 5,231,403 | A * | 7/1993 | Pierce | 342/192 |
|---|---|---|---|---|
| 5,337,053 | A * | 8/1994 | Dwyer | 342/90 |
| 5,602,751 | A * | 2/1997 | Edelblute | 702/77 |
| 6,294,956 | B1 * | 9/2001 | Ghanadan et al. | 330/124 R |
| 6,697,633 | B1 * | 2/2004 | Dogan et al. | 455/509 |
| 6,822,606 | B2 * | 11/2004 | Ponsford et al. | 342/192 |
| 6,944,434 | B2 * | 9/2005 | Mattellini et al. | 455/296 |
| 7,567,635 | B2 * | 7/2009 | Scheim et al. | 375/341 |
| 2003/0081804 | A1 * | 5/2003 | Kates | 381/316 |
| 2006/0097730 | A1 * | 5/2006 | Park et al. | 324/534 |
| 2010/0002816 | A1 * | 1/2010 | Mody et al. | 375/350 |

OTHER PUBLICATIONS

Brian Sadler, Detection in Correlated Impulsive Noise Using Fourth-Order Cumulants, IEEE Transactions on Signal Processing, vol. 44, No. I I, Nov. 1996, pp. 2793-2800.*
McLaughlin et al. Introducing Higher Order Statistics (HOS) for the Detection of Nonlinearities, Department of Electrical Engineering, University of Edinburgh, Sep. 15, 1995, pp. 1-5.*
Mitola III, "Cognitive Radio: An Integrated Agent Architecture for Software Defined Radio," Ph. D. Thesis, Royal Institute of Technology, Sweden, Spring 2000, cover page and page i only.

(Continued)

Primary Examiner — Lewis A Bullock, Jr.
Assistant Examiner — Kevin G Hughes
(74) Attorney, Agent, or Firm — Maine Cernota & Rardin; David A. Rardin; Daniel J. Long

(57) ABSTRACT

An algorithm to detect a broad class of signals in Gaussian noise using higher-order statistics. The algorithm detects a number of different signal types. The signals may be in the base-band or the pass-band, single-carrier or multi-carrier, frequency hopping or non-hopping, broad-pulse or narrow-pulse etc. In a typical setting this algorithm provides an error rate of 3/100 at a signal to noise ratio of 0 dB. This algorithm gives the time frequency detection ratio that may be used to determine if the detected signal falls in Class Single-Carrier of Class Multi-Carrier. Additionally this algorithm may be used for a number of different applications such as multiple signal identification, finding the basis functions of the received signal and the like.

17 Claims, 9 Drawing Sheets

OTHER PUBLICATIONS

Haykin, "Cognitive Radio: Brain-Empowered Wireless Communications," IEEE J. Select. Areas Commun., vol. 23, No. 2, pp. 201-209, Feb. 2005.

Sadler, et al. "Estimation and Detection in NonGaussian Noise Using Higher Order Statistics," IEEE Trans. Signal Processing, vol. 42, No. 10, pp. 2729-2741, Oct. 1994.

Giannakis, et al., "A Unifying Maximum-Likelihood View of Cumulant and Polyspectral Measures for Non-Gaussian Signal Classification and Estimation," IEEE Trans. Inform. Theory, vol. 38, No. 2, pp. 386-406, Mar. 1992.

Mendel, "Tutorial on Higher-Order Statistics (Spectra) in Signal Processing and Systems Theory: Theoretical Results and Some Applications," IEEE Trans. Signal Processing, vol. 79, No. 3, pp. 278-305, Mar. 1991.

Nikias, et al., "Signal Processing with Higher-Order Spectra," IEEE J. Select. Areas Commun., pp. 10-37, Jul. 1993.

Dogan, et al., "Single Sensor Detection and Classification of Multiple Sources by Higher Order Spectra," IEE Proceedings-F, vol. 140, No. 6, pp. 350-355, Dec. 1993.

* cited by examiner

METHOD FOR DETECTING A BROAD CLASS OF SIGNALS IN GAUSSIAN NOISE USING HIGHER ORDER STATISTICS IN BOTH TIME AND FREQUENCY DOMAINS

CROSS REFERENCE TO RELATED APPLICATION

This application claims rights under 35 U.S.C. §119(e) from U.S. Application Ser. No. 60/814,367 filed Jun. 16, 2006, the contents of which are incorporated herein by reference.

STATEMENT OF GOVERNMENT INTEREST

This invention was made with United States Government support under Contract No. W15P7T-05-C-P033 awarded by the Defense Advanced Research Projects Administration (DARPA). The United States Government has certain rights in this invention.

BACKGROUND OF THE INVENTION

1. Field of the Invention

This invention relates to signal processing and more particularly to algorithms for use in detecting a broad class of signals in Gaussian noise using higher-order statistics.

2. Brief Description Of Prior Developments

As telecommunications equipment evolves in capability and complexity, and multiple-input and multiple-output (MIMO) systems push the system throughput, it is not going to be too long before we start seeing cognitive radios in the marketplace, as is disclosed in J. Mitola, "Cognitive Radio: An Integrated Agent Architecture for Software Defined Radio," Ph. D. Thesis, Royal Institute of Technology, Sweden, Spring 2000; and S. Haykin, "Cognitive Radio: Brain-Empowered Wireless Communications," IEEE J. Select. Areas Commun., vol. 23, no. 2, pp. 201-220, February 2005, the contents all of which are incorporated herein by reference. Cognitive radios will help not just the commercial systems but the military communication systems as well, by doing away with the need for comprehensive frequency planning. In fact a cognitive radio would be capable of sensing its environment, making decisions on the types of signals present, learning the patterns and choosing the best possible method of transmitting the information. They would be situation aware, and capable of making decisions to ensure error-free and smooth transfer of bits between the users. Cognitive radios will be based on software defined radio (SDR) platforms and will try to understand not only what the users want but also what the surrounding environment can provide. The first step for any cognitive radio will be to understand the surrounding environment and to detect the ambient signals that are present. A typical procedure is to collect the signal from the surrounding environment and to identify whether it represents some meaningful information or it is just noise.

A need therefore exists for an improved algorithm for use in detecting a broad class of signals in Gaussian noise using higher-order statistics.

SUMMARY OF INVENTION

The present invention addresses this first step of signal detection in presence of additive white Gaussian noise (AWGN) using higher-order statistics (HOS). We then provide several different applications where our algorithm may be used along with the results on real-time over the air collected test waveforms. The prior art discusses work on signal detection in AWGN using HOS as qualifiers, as is disclosed in B. M. Sadler, G. B. Giannakis, and K. S. Lii, "Estimation and Detection in NonGaussian Noise Using Higher Order Statistics," IEEE Trans. Signal Processing, vol. 42, no. 10, pp. 2729{2741, October 1994; and G. B. Giannakis and M. Tsatsanis, "A Unifying Maximum-Likelihood View of Cumulant and Polyspectral Measures for Non-Gaussian Signal Classification and Estimation," IEEE Trans. Inform. Theory, vol. 38, no. 2, pp. 386-406, March 1992, the contents all of which are incorporated herein by reference. Our proposed algorithm, however, is extremely efficient and simple to implement and it may be used to detect a broad class of signal types such as base-band, pass-band, single-carrier, multi-carrier, frequency-hopping, non-frequency-hopping, broadband, narrow-band, broad-pulse, narrow-pulse etc. Our signal detection algorithm performs well at low signal to noise ratio (SNR), and based on system requirements for tolerable probability of detection (PD) and probability of false alarms (PFA) it is possible to tailor the algorithm performance by altering a few parameters. Additionally, this algorithm gives the time frequency detection ratio (TFDR) which may be used to determine if the detected signal falls in Class Single-Carrier of Class Multi-Carrier. Finally we describe some applications such as multiple signal identification and finding the basis functions for the received signal where this algorithm may be used effectively.

BRIEF DESCRIPTION OF THE DRAWINGS

The present invention is further described with reference to the accompanying drawings wherein.

DETAILED DESCRIPTION OF THE PREFERRED EMBODIMENT

I. Higher-order Statistics as Non-Gaussian Qualifiers

Figure 1:
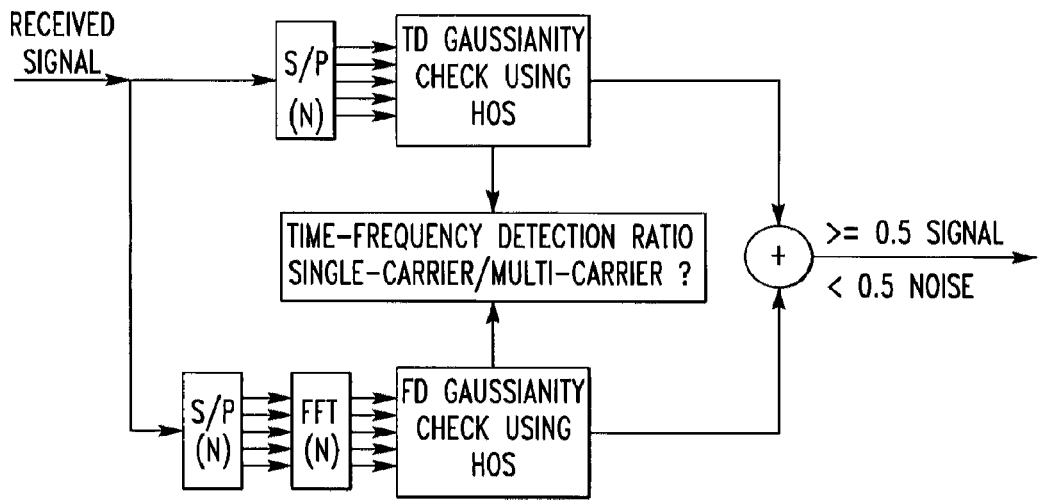
FIG. 1 is a block diagram for the signal or noise identification algorithm of the present invention.
Figure 2:
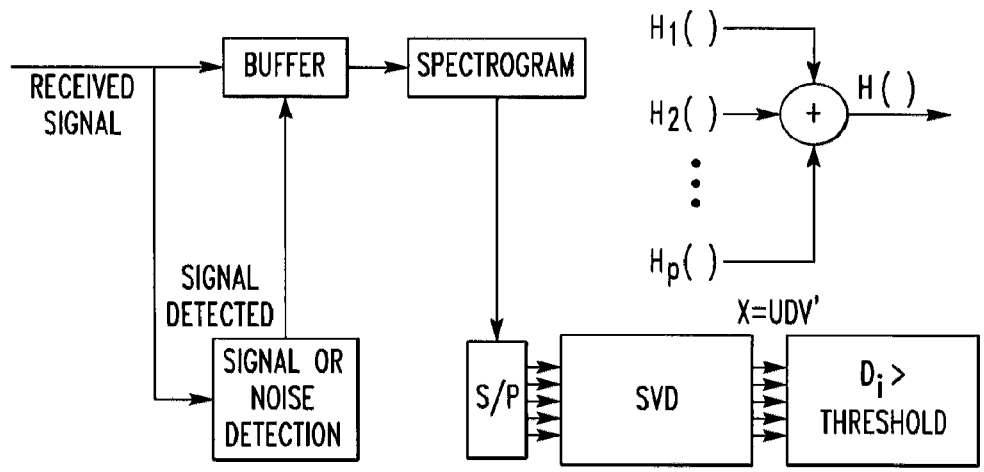
FIG. 2 is a block diagram for identifying the number of signal types in the received signal in a preferred embodiment of the present invention.
Figure 3:
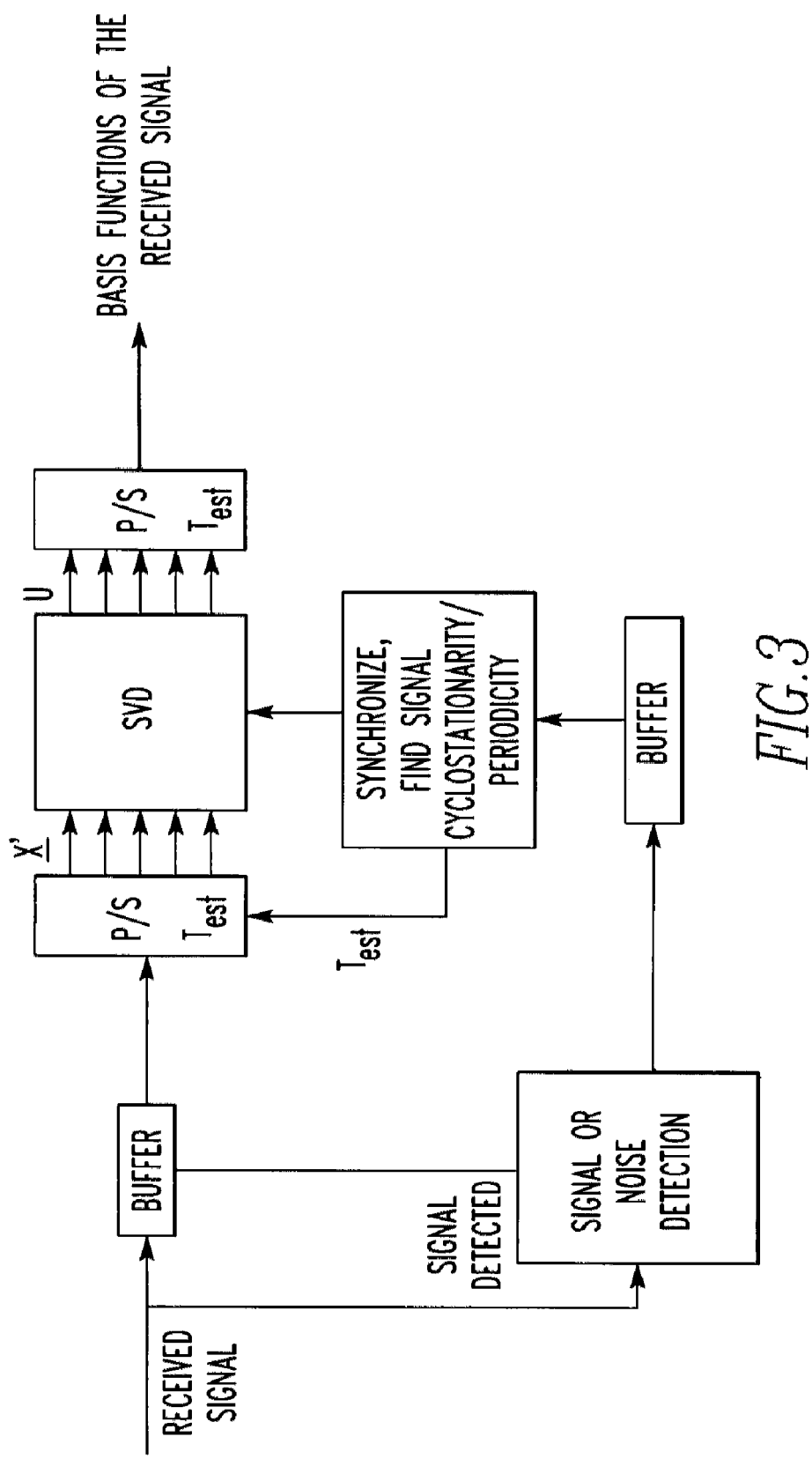
FIG. 3 is a block diagram for finding the basic functions of the received signal in a preferred embodiment of the present invention.

The idea for this algorithm comes from a well-known fact that the higher-order cumulants for a Gaussian process are zero, as is disclosed in K. S. Shanmugan and A. M. Breipohl, "Random Signals: Detection, Estimation and Data Analysis," John Wiley & Sons, New York, 1988; J. M. Mendel, "Tutorial on Higher-Order Statistics (Spectra) in Signal Processing and Systems Theory: Theoretical Results and Some Applications," IEEE Trans. Signal Processing, vol. 79, no. 3, pp. 278{305, March 1991; and C. L. Nikias and J. M. Mendel, "Signal Processing with Higher-Order Spectra," IEEE J. Select. Areas Commun., pp. 10-37, July 1993, the contents all of which are incorporated herein by reference. Cumulants are defined as the multiplicative coefficients for each term of the Taylor series expansion of the logarithm of the characteristic function. The characteristic function of $\psi_X(\omega)$ of a random variable X is defined as $$\psi_X(\omega) = E\{\exp(j\omega X)\} \quad (1)$$

where $j=\sqrt{-4}$. The natural logarithm of the characteristic function is defined as the cumulant generating function $$C_X(\omega) = \log\{\psi_X(\omega)\} \quad (2)$$

or in other words, $$\exp\{C_X(\omega)\} = \psi_X(\omega) \quad (3)$$

Expanding both sides of the equation in a series form results in the following equality.

$$\exp\left\{c_1(j\omega) + c_2\frac{(j\omega)^2}{2!} + \ldots + c_n\frac{(j\omega)^n}{n!}\right\} = \quad (4)$$

$$1 + j\omega E[X] + \frac{(j\omega)^2}{2!}E[X^2] + \ldots + \frac{(j\omega)^n}{n!}E[X^n],$$

where $c_1, c_2 \ldots c_n$ are the cumulants of the random process and $E[X]=m_1$, $E[X^2]=m_2$, ... $E[X^n]=m_n$ are the moments of the random process. When both the sides of the equations are expanded and the powers compared, we can obtain the relationship between the moments and the cumulants of the random process as $$c_1 = m_1$$

$$c_2 = m_2 - m_1^2$$

$$c_3 = m_3 - 3m_1 m_2 + 2m_1^3$$

$$c_4 = m_4 - 4m_1 m_3 - 3m_2^2 + 12m_1^2 m_2 - 6m_1^4 \quad (5)$$

Since we need to extract these statistics of the random process from the collected waveforms, after sampling the waveforms, we divide them into segments of length N and place them in vectors x. We then estimate the higher-order moments for each of the segments using the following approximation $$\hat{m}_r = \frac{1}{N}\sum_{n=0}^{N-1}(x_n - \bar{x})^r, \quad (6)$$

where $\hat{m}_r$ is the estimate of the $m^{th}$ order moment of the collected waveform samples, and $\bar{x}$ is the mean value for the N given samples of data defined as $$\bar{x} = \frac{1}{N}\sum_{n=0}^{N-1}x_n. \quad (7)$$

Using (5) one can then estimate the cumulants for the received signal samples.

II. Algorithm Development

Since the cumulants are computed from the estimates of the moments for every segment of duration N, the longer the segment, better are the statistics and better the estimation. However, in practice it is not possible to keep N to be extremely large and it is limited by the duty cycle of the signal itself, and the rate at which the signal changes. This means that even if the received waveform belongs to Class Noise, it is possible that the cumulants may be non-zero. Hence, instead of making a hard decision, we define a probability $P_{Signal}$ that a certain segment belongs to the Class Signal. We also define a threshold which when exceeded, increases the probability that the received waveform falls into Class Signal, and when not, decreases the same. The algorithm for this is as follows:

Proposed Signal Detection Algorithm

Let R be the number of cumulants of the order greater than two available for computation, and choose some $0<\delta<1$. In this embodiment we let $$\delta = \frac{0.5}{R}.$$

Let $P_{Signal}=0:5$ and choose some $\gamma \in \{1, 2, \ldots\}$. Compute all the R+2 moments and cumulants.
1. for r=2 to (R+2);
   if $|c_r|<\gamma|m2|^{r/2}$, then $P_{Signal}=P_{Signal}-\delta$,
   else if $|c_r|\geq\gamma|m2|^{r/2}$, then $P_{Signal}=P_{Signal}+\delta$
   end
2. If $P_{Signal}\geq 0.5$ then x belongs to Class Signal,
3. If $P_{Signal}<0.5$ then $\bar{x}$ belongs to Class Noise.

The parameter $\gamma$ is used to control the $P_{FA}$ and the $P_D$. At low values of $\gamma$, $P_{FA}$ is high and $P_D$ is low, whereas, as $\gamma$ increases, $P_{FA}$ falls and $P_D$ increases. For most cognitive radio applications, higher false alarms are tolerable as long all the signals that are present are detected accurately.

A. Detection of a Broad Class of Signals

Many types of information bearing signals show a Gaussian distribution in the time domain whereas in the frequency domain they are non-Gaussian. For example, the amplitude distribution of a direct sequence spread spectrum (DSSS) signal in the time-domain is non-Gaussian. On the other hand, the amplitude distribution of the multi-carrier signal samples, formed as a result of orthogonal frequency division multiplexing (OFDM) in the time-domain is Gaussian, but the distribution of its complex samples in the frequency domain is not. Hence in order to be able to detect all these signal types, we apply the algorithm in time as well as in the frequency domains as shown in FIG. 1. The received waveform samples are divided into segments of length N, and are sent to two different branches. One detects the presence of the signal in the time domain and the other in the frequency domain. Frequency domain detection is performed by first taking Fourier transform of each of the segments as $$X_k = \frac{1}{\sqrt{N}} \sum_{n=0}^{N-1} x_n \exp\left\{-j\frac{2\pi nk}{N}\right\}, k = 0, 1, \ldots, N-1, \quad (8)$$

the samples $X_k$'s are converted to vectors $\bar{X}$ and sent to our proposed signal detection algorithm. The output probabilities originating from the time-domain detection and the frequency-domain detection are weighted equally and added together and if the net value is greater than or equal to 0.5, then the received waveform segment falls into Class Signal, otherwise it is falls into Class Noise. It must be noted if the received waveforms segments or their Fourier transforms are complex then they are first divided into their real and imaginary parts and processed using the signal detection algorithm separately.

III. Applications of the Proposed Signal Detection Algorithm

A. Time Frequency Detection Ratio and Single-Carrier, Multi-Carrier Hypotheses Testing The TFDR as the name suggests denotes the ratio of the number of segments detected in the time domain to the number of segments detected in the frequency domain NTD over a particular length of time. Hence $$TFDR = \frac{N_{TD}}{N_{FD}},$$

where $N_{TD}$ is the number of segments detected in the time-domain and $N_{FD}$ is the number of segments detected in the frequency domain. As previously suggested, a single-carrier waveform such as DSSS shows a non-Gaussian amplitude distribution of its samples in the time-domain. Hence we expect the $TFDR_{DSSS} \geq 0.5$. On the other hand, a multi-carrier waveform such as OFDM, shows Gaussian amplitude distribution in the time-domain, however a non-Gaussian amplitude distribution in the frequency domain. As a result, we expect that $TFDR_{OFDM} < 0.5$. Hence this algorithm may also be used to determine if the received waveform falls into Class Single-Carrier or Class Multi-Carrier.

B. Multiple Signal Identification

Once it is known that the received waveform belongs to Class Signal, it is useful to find out how many different signal types are present in it. M. C. Dogan and J. M. Mendel, "Single Sensor Detection and Classification of Multiple Sources by Higher Order Spectra," IEE Proceedings-F, vol. 140, no. 6, pp. 1451-1458, December 1993, the contents of which are incorporated herein by reference, discloses the use of the tri-spectrum of the received waveform. The tri-spectrum is projected onto 2-Dimensions and sampled to form a matrix. The singular value decomposition (SVD) is then applied to find out the dominant components. The number of significant singular values determines the number of signal types present in the received waveform. We apply a similar method for our case. However, instead of tri-spectrum we obtain a compressed spectrogram of the signal only segments. If higher computation power is available, then one may use the tri-spectrum instead. The compressed spectrogram of the signal only segments forms a matrix X. We then take the SVD of this compressed spectrogram, and find out the number of dominant singular values in it which gives us the number of different signal types that are present in the signal. As described above, the term "compressed spectrogram" describes a spectrogram of the "signal only" segments of a received waveform.

C. Finding the Basis Functions for the Received Signal

Figure 10:
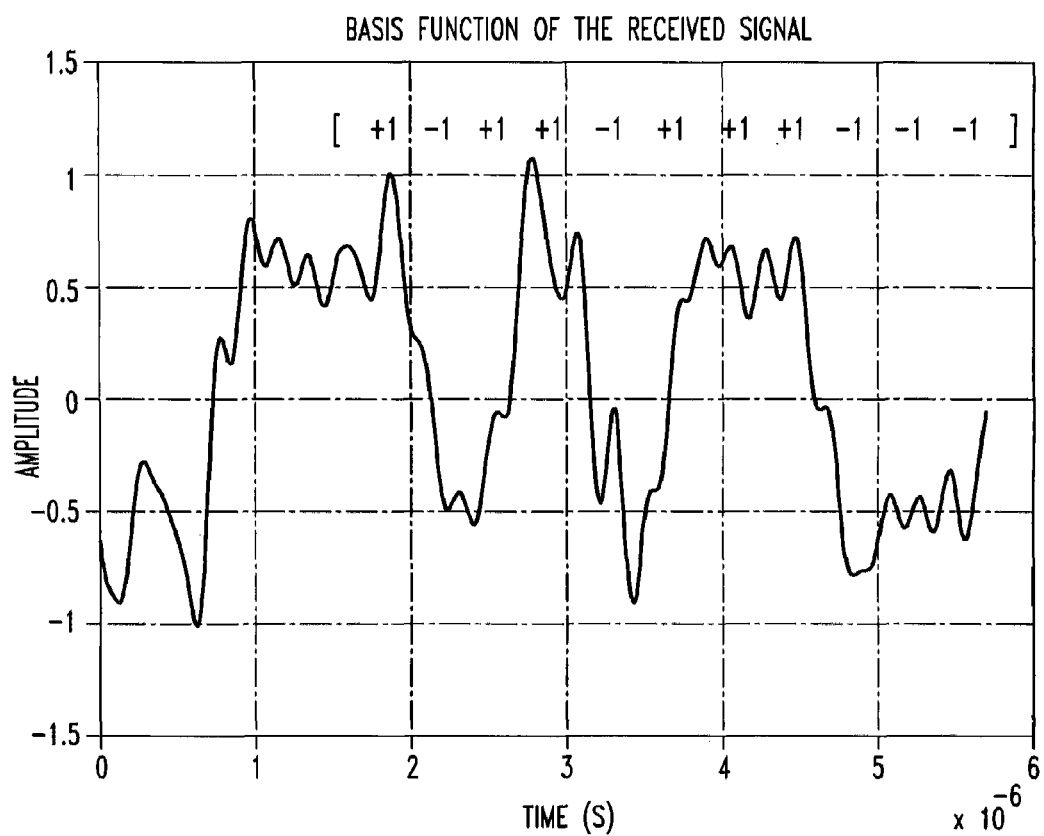

Basis functions of the received signals could provide us with important information about the signal itself and what constitutes it. For example, it would be important to know the spreading sequence, given that the received signal is formed using code division multiplexing (CDMA). In order to find the basis functions of the received signal, the SVD of the signal only matrix is obtained. However, rather than choosing the length of the columns of the matrix arbitrarily, some prior synchronization is done on the received waveform to find the underlying periodicity. This estimate of the periodicity in the waveform is used to determine the number of samples in each column of a synchronized signal only matrix X. as shown in FIG. 10. Then the SVD of this synchronized signal only matrix is obtained and the vector corresponding to various principal singular values determine the basis functions of the received signal.

IV. Simulation and Experimental Results

Figure 4:
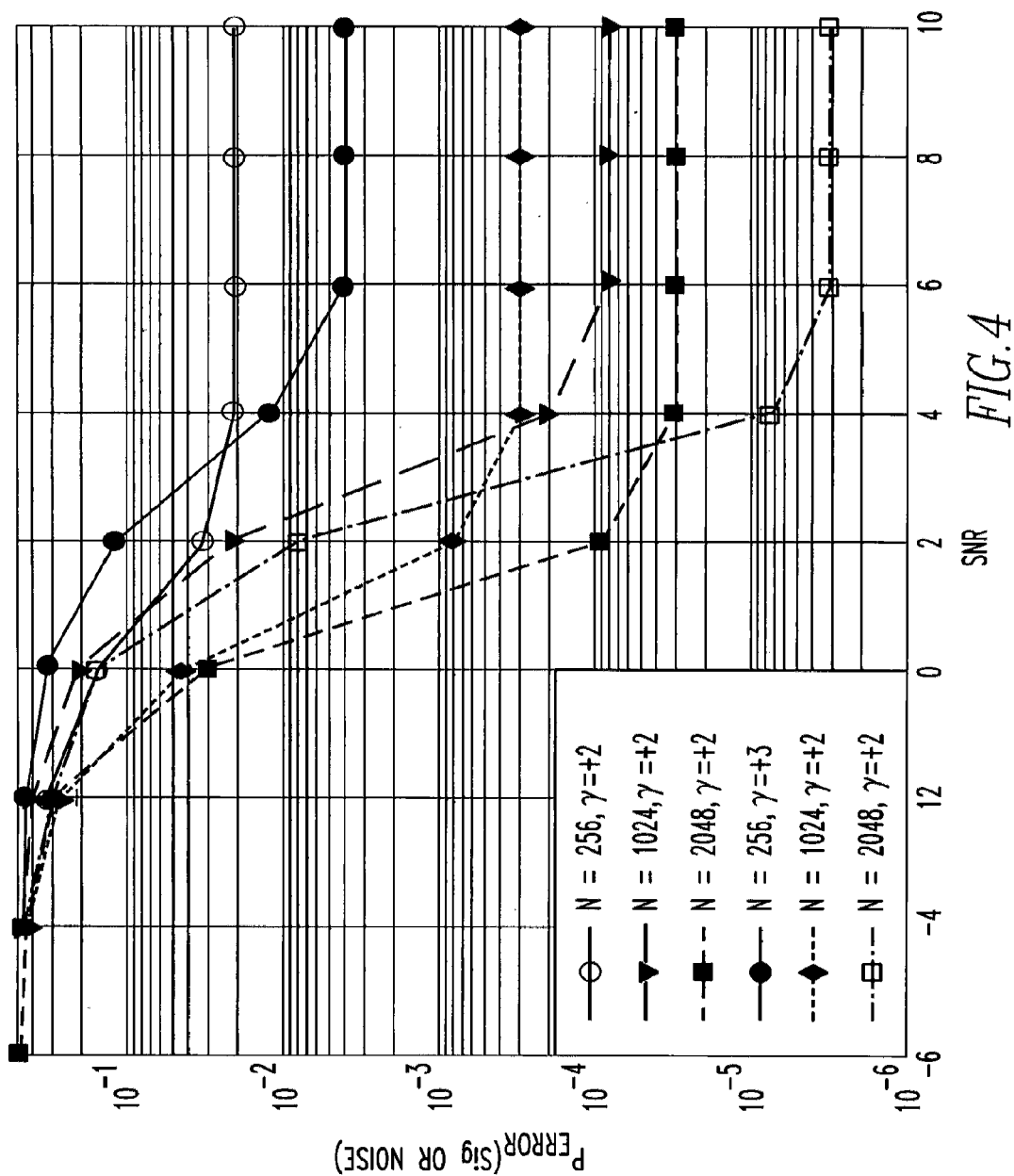
FIG. 4 is a graph showing probability of error in detecting the signal or noise for various values of segment size N and threshold parameter γ in a preferred embodiment of the present invention.

This section explains the simulation and experimental results for the proposed signal detection algorithm and its applications. FIG. 4 shows the probability of error in correct classification of a segment of the received waveform versus the average SNR. The direct sequence spread spectrum (DSSS) waveforms confirming to the IEEE 802.11b Standard, as is disclosed in IEEE Standard 802.11g-2003, Part 11: Wireless LAN Medium Access Control (MAC) and Physical Layer (PHY) Specifications: Higher-speed Physical Layer Extension in the 2.4 GHz Band., IEEE Std. 802.11, 2003, were generated and transmitted over an AWGN channel. The chips at the receiver were over-sampled by a factor of eight, and an average energy in the received samples for the entire data record was used to compute the signal energy. An appropriate noise was added to the received samples. The figure shows the effect of choosing different segment-lengths (N) and different values of the threshold coefficient γ on the probability of error. We calculated the cumulants till the 6th order and hence R for our case was 4. The segment length N was chosen to be of a power of 2 in order to efficiently compute its fast Fourier transform (FFT). Larger the value of N, more accurate are the estimates of the cumulants and lower are the error floors in the probability curves. On the other hand the value of γ may be used to move the curves sideways. Lower value of γ results in a lower threshold and hence lower $P_D$. Higher values of γ results in higher $P_D$ and lower $P_{FA}$. Based on the curves obtained, we choose γ=2 for all our experiments for over-the-air-collected test data.

Figure 5:
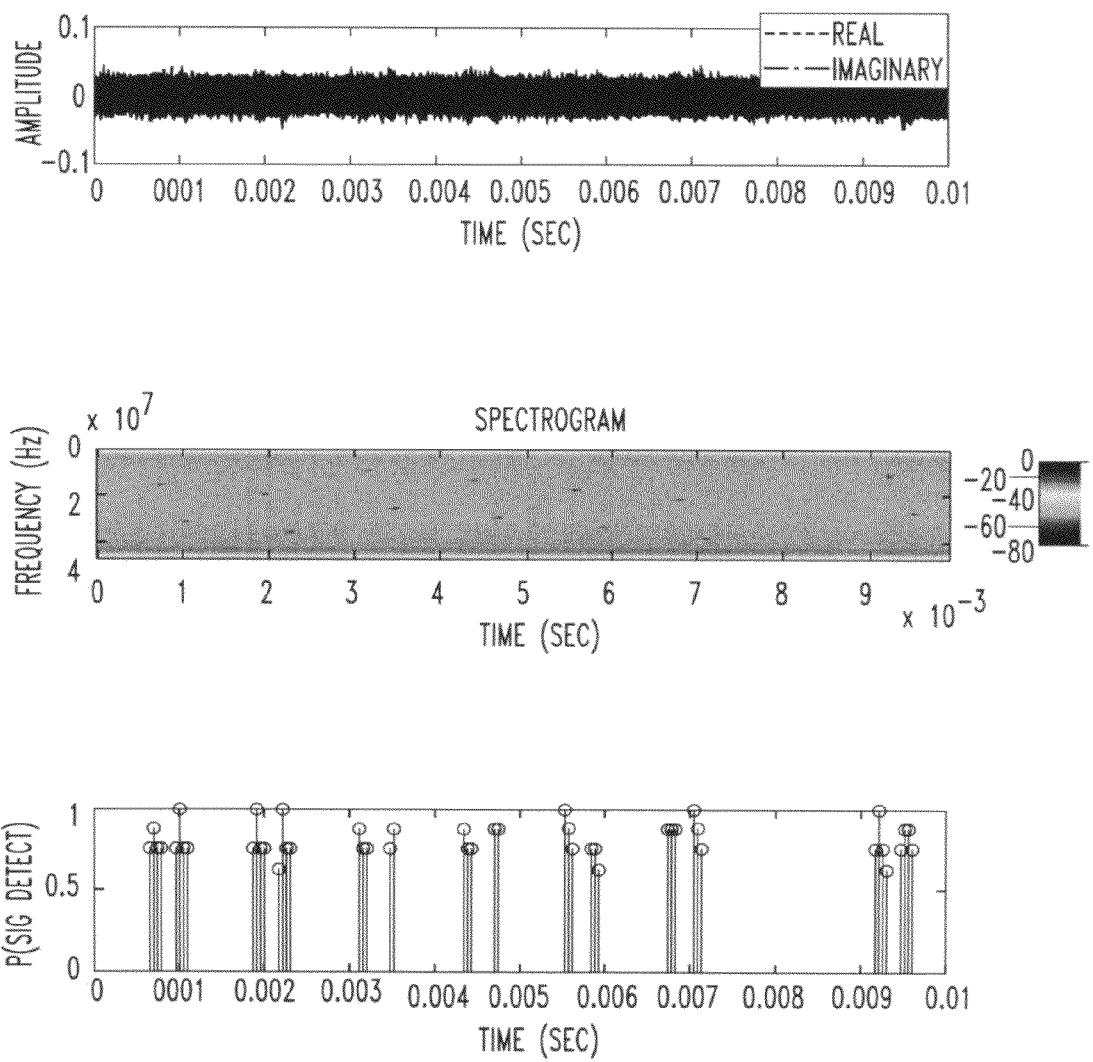
FIG. 5 shows (top) real and imaginary samples of the over-the-air-collected transmissions from Bluetooth devices for a window of 10 mS; (middle) a spectrogram for the collected samples; (bottom) the output of the signal or noise detection algorithm.
Figure 6:
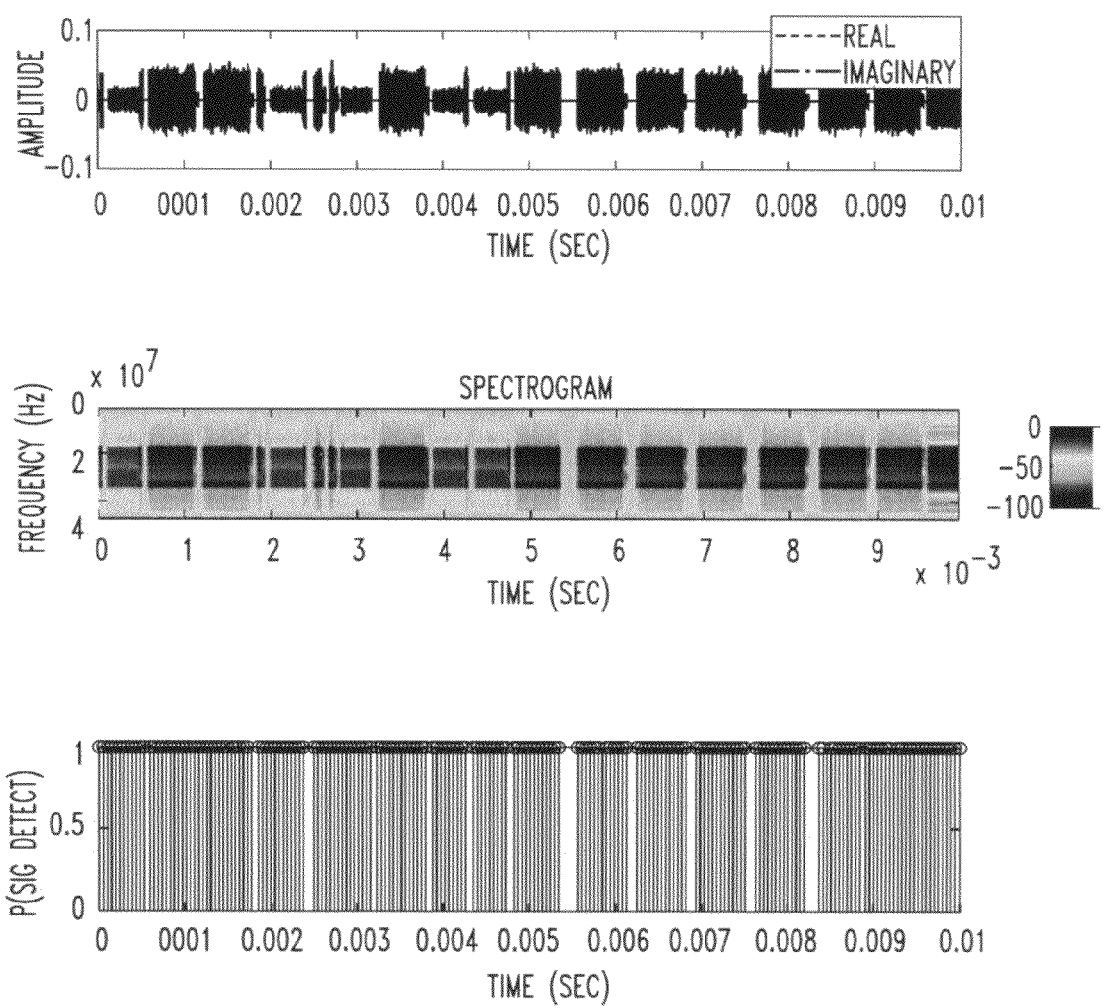
FIG. 6 shows (top) real and imaginary samples of the over-the-air-collected transmissions from IEEE 802.11g devices for a window of 10 mS; (middle) a spectrogram for the collected samples; (bottom) the output of the signal or noise detection algorithm.

FIG. 5 shows the performance of our proposed signal or noise detection algorithm on a narrow-band, narrow-pulse frequency hopping waveform such as Bluetooth™ for personal area networks (PAN), as is disclosed in IEEE Standard for Wireless Personal Area Networks Based on the Bluetooth™ v1.1 Foundation Specifications, http://www.ieee802.org/15/pub/TG1.html, IEEE Std. 802.15.1, 2002, collected using an Agilent 89640 signal analyzer in a trailer located in the parking lot of our company and using a sampling frequency of 47.499 MHz. The Bluetooth devices were kept at an approximate distance of 5 meters from the signal analyzer and cheap isotropic antennas were used to receive the signals. The segment-length (N) was chosen to be 2048 samples, which was equivalent to approximately 50 μS of data to estimate the higher-order cumulants. The FFT block length was also chosen to be of the same size as the segment length. FIG. 5 shows the real and imaginary data for a window of 10 μS. As can be seen the signals are weak and hardly visible. The figure in the middle shows the spectrogram and hence the time frequency distribution (TFD) of the collected signal and finally the bottom figure shows the results of applying our proposed signal or noise detection algorithm with the term γ set at 2. FIG. 6 shows the same for an orthogonal frequency division multiplexed (OFDM) type of a received waveform that belonged to the devices conforming to the IEEE 802.11g Standard, as is disclosed in IEEE Standard 802.11g, Part 11: Wireless LAN Medium Access Control (MAC) and Physical Layer (PHY) Specifications: Amendment 4: Further Higher Data Rate Extension in the 2.4 GHz Band., IEEE Std. 802.11, 2003.

Figure 7:
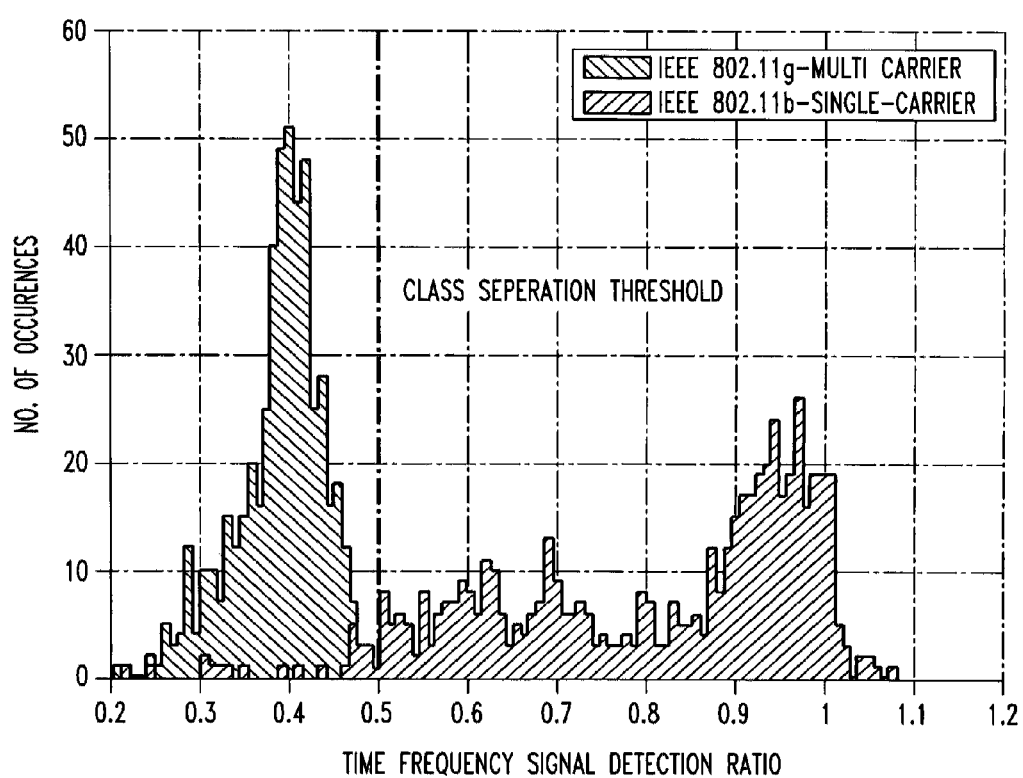
FIG. 7 is a graph showing distribution of the time frequency detection ratio of the over-the-air-collected waveforms belonging to the IEEE 802.11b (DSSS) and IEEE 802.11g (OFDM) waveform types, the threshold being placed at 0.5 and N=2048.

FIG. 7 shows the TFDR statistics for an IEEE 802.11b waveforms using single-carrier transmission and the IEEE 802.11g waveforms using OFDM. TFDR is computed by first dividing the received waveform into 10 mS frames and further dividing each frame into segments of 2048 samples each. We then find the number of segments detected in the time domain versus the number detected in the frequency domain for each frame. The threshold for the class separation was set at 0.5. Based on the over the air collected test data, the IEEE 802.11b frames of 10 mS each were classified as multi-carrier 13 out of 518 times and the IEEE 802.11g frames of the same length were classified as single-carrier 25 out of 565 times. Hence the net probability of error was approximately 3.5%.

Figure 8:
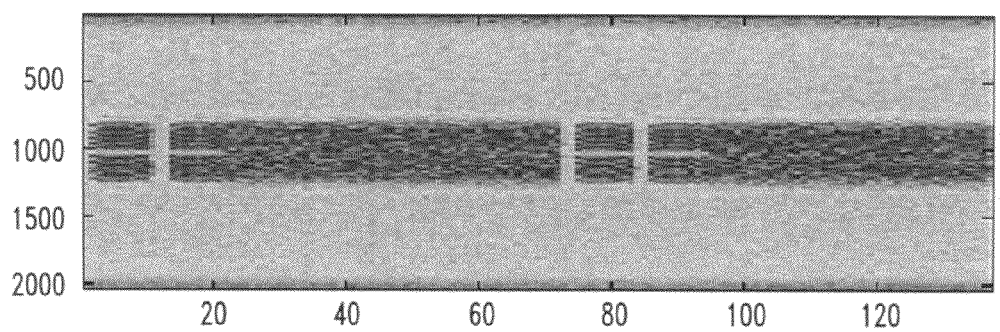
FIG. 8 consists of a compressed spectrogram of the IEEE 802.11b and its singular value distribution.
Figure 8:
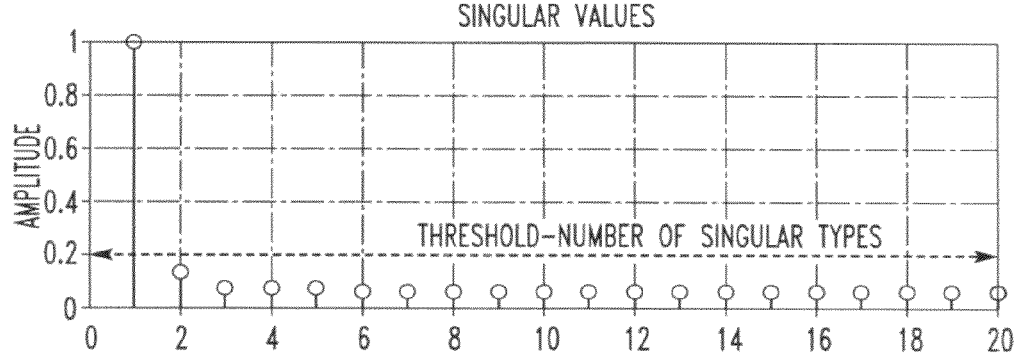
Figure 9:
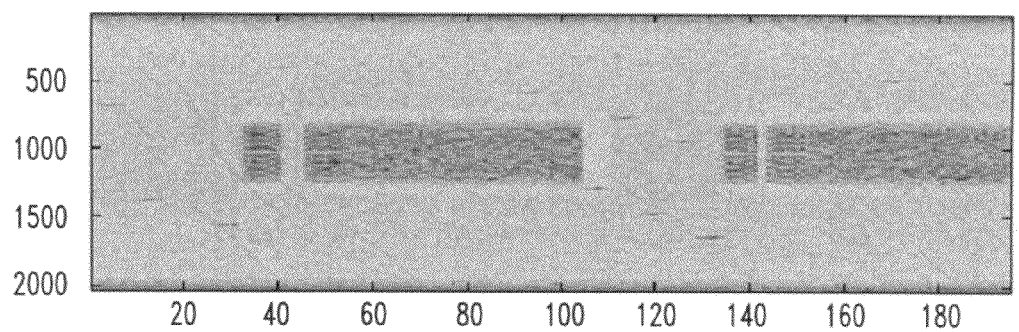
FIG. 9 consists of a compressed spectrogram of the IEEE 802.11b; and the Bluetooth waveforms added together and its singular value distribution; and, FIG. 10 is a vector corresponding to the first singular value of the SVD of a synchronized signal-only matrix of the over-the-air-collected IEEE 802.11b signal.
Figure 9:
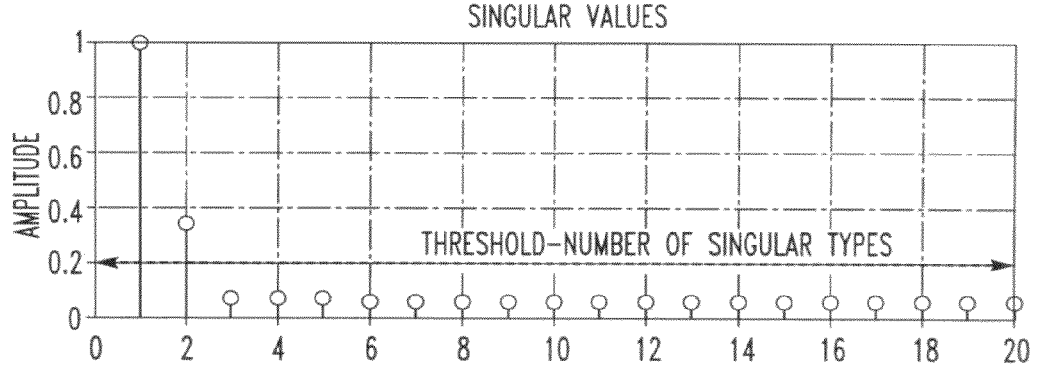

FIGS. 8 and 9 show the results for identifying the number of different signal types in the received waveforms as explained in IV-B. Based on our proposed detection algorithm, the segments that are identified to contain useful signals are concatenated to form a signal only vector, and its spectrogram is taken to obtain a 2-D matrix X. The SVD of this compressed spectrogram gives the singular value distribution and the number of dominant singular values determines the number of possible signal types. FIG. 8 shows an IEEE 802.11b compressed spectrogram and the singular value distribution resulting in the identification of only one signal. On the other hand, FIG. 9 shows the compressed spectrogram of the IEEE 802.11b and the Bluetooth waveforms added together and its singular value distribution which results in the identification of two signal types.

Finally, FIG. 10 shows the results of identifying the basis functions for the received signal as explained in III-C. The over the air collected IEEE 802.11b waveforms were used to find the basis function. The waveform shown corresponds to the first singular value of SVD of the time synchronized signal only matrix. The IEEE 802.11b waveforms use the spreading sequence given by [+1 −1 +1 +1 −1 +1 +1 +1 −1 −1 −1] and as can be seen in the figure, we can clearly identify this spreading sequence as an output of our finding the basis functions algorithms.

V. Conclusions

Those skilled in the art will appreciate that an algorithm has been disclosed that detects a broad class of signals in Gaussian noise using higher-order statistics. The algorithm was able to detect a number of different signal types. In a typical setting this algorithm provided an error rate of 3/100 at a signal to noise ratio of 0 dB. This algorithm gave the time frequency detection ratio which was used to determine if the detected signal fell in Class Single-Carrier of Class Multi-Carrier. Additionally we showed how this algorithm may be used in applications such as signal identification and finding the basis functions of the received signals.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for detecting a broad class of signals in Gaussian noise using Higher Order Statistics in both time as well as frequency domains, comprising:

receiving an input signal in a signal receiving module;

dividing said input signal into a plurality of segments in a signal divider module;

breaking up said plurality of segments into real and imaginary parts;

setting an initial probability value to 0.5 fir a probability of a signal within said broad class of signals being present in one given segment of said plurality of segments;

computing a first set of cumulants of an order greater than two from said plurality of segments in a data processing module, wherein;

R is a total number of cumulants comprising cumulants of real parts ($c_r^{real}$) and cumulants of imaginary parts ($C_r^{imaginary}$) of order greater than two available for computation for said real and said imaginary parts of each segment of said plurality of segments of data respectively;

transforming said plurality of segments into transformed segments by performing a Fourier transform on said plurality of segments in a Fourier Transform stage;

computing a second set of cumulants of an order greater than two of said transformed segments in said data processing module;

said order of said cumulantsis defined by r, where value of r goes from 2 to (R+2);

comparing said first set of cumulants and said second set of cumulants with a first threshold value in said data processing module;

said first threshold equals $\gamma |m_2^{real}|^{r/2}$ for said cumulants of real parts and equals $\gamma |m_2^{imaginary}|^{r/2}$ for said cumulants of imaginary parts;

wherein $m_2^{real}$ is a second order moment of said real part of segments and $M_2^{imaginary}$ is a second order moment of said imaginary part of segments;

wherein γ is a positive whole number;

increasing a probability metric by a determined step amount if either of said cumulant and if both of said cumulants exceeds said first threshold;

decreasing said probability metric by said determined step amount if either of said cumulants and if both of said cumulants does not exceed said first threshold;

said determined step amount is defined as $$\delta = \frac{0.5}{R};$$

concluding that a signal is present if a final probability metric is greater than or equal to the second threshold value;

said second threshold value is 0.5; and wherein said final probability metric is computed by combining said real and said imaginary final probability metrics after adjustment steps of said increasing and said decreasing said probability metric for said real part and said imaginary parts.

2. The method in claim 1 where the first and second set of cumulants are combined to determine if the segment of data belongs to a Class Signal or a Class Noise.

3. The method in claim 1 further comprising pre-processing said input signal, which comprises process selected from a group consisting of filtering, noise whitening, down-conversion, up-conversion, frequency shift, frequency translation, re-sampling, down-sampling, up-sampling, and signal conditioning applied to said input signal.

4. The method of claim 2 further comprising:
filtering said input signal to ensure that only said signals present in a determined frequency band remain;
breaking said received data stream into segments and determining if each of said segments belongs to Class signal or Noise;
taking a spectrogram of only those segments which belong to Class Signal to form a Compressed Spectrogram;
converting said Compressed Spectrogram into a matrix and taking a Singular Value Decomposition of said matrix; and
finding a number of singular values that exceeds a threshold to determine a number of different types of signals present in a given frequency band.

5. The method of claim 1 wherein said signals are in baseband.

6. The method of claim 1 wherein said signals are in passband.

7. The method of claim 1 wherein said signals are single-carrier.

8. The method of claim 1 wherein said signals are multi-carrier.

9. The method of claim 1 wherein said signals are frequency hopping.

10. The method of claim 1 wherein said the signals are non-frequency hopping.

11. The method of claim 1 wherein said signals are of type Direct Sequence Spread Spectrum.

12. The method of claim 1 wherein said signals are of type Multi-Carrier Spread Spectrum.

13. The method of claim 1 wherein said signals are non-Gaussian in time domain.

14. The method of claim 1 wherein said signals are non-Gaussian in frequency domain.

15. The method of claim 2 further comprising:
determining a number of segments belonging to Class Signal in a Time Domain ($N_T$);
determining a number of segments belonging to Class Signal in a Frequency Domain ($N_F$);
concluding that said detected signal is single-carrier if a Time Frequency Detection Ratio (TFDR) is greater than or equal to 1; and
concluding that said detected signal is multi-carrier if TFDR<1, wherein said TFDR equals $N_T/(N_T+N_F)$.

16. The method of claim 1 further comprising:
filtering received data in said received input signal to ensure that only signals present in given frequency bands remain;
breaking a received data stream from said received input signal into filtered segments and determining if each of said filtered segments belongs to Class Signal or Class Noise;
storing only said filtered segments of data that belong to said Class Signal in a buffer;
analyzing said filtered segments contained in said buffer to obtain a periodicity inherent within said data stored inside said buffer;
forming a matrix of said data contained in said buffer such that a length of columns in said matrix corresponds to results from said analyzing said filtered segments contained in said buffer;
taking a Singular Value Decomposition (SVD) of said matrix; and
determining a basis set of said signal as singular vectors corresponding to principal singular values of said SVD.

17. The method of claim 1 comprising:
applying a Fast Fourier Transform (FFT) to said segments of data thereby converting said segments into a frequency domain, wherein R equals a number of moments comprising real moments ($m^{real}$) and imaginary moments ($m^{imaginary}$) and cumulants comprising real cumulants ($c^{real}$) and imaginary cumulants ($c^{imaginary}$) of order greater than two available for computation for real and imaginary parts of each said segment of data in said frequency domain;

r equals 2 to R+2;

$\delta$ equals a value between zero and one defined by 0.5 divided by said R;

$\gamma$ equals a positive whole number;

$P_{Signal\_real}$ is a probability that a real data segment comprises a signal;

$P_{Signal\_imaginary}$ is a probability that an imaginary data segment comprises a signal;

wherein for each value of r, if $|c^{real}|$ is less than $\gamma|c^{real}|^{r/2}$, then value of said $P_{Signal\_real}$ equals $P_{Signal\_real}$ minus $\delta$;

if $|c^{real}|$ real is greater than or equal to $\gamma|c^{real}|^{r/2}$, then value of said $P_{Signal\_real}$ equals $P_{Signal\_real}$ plus $\delta$;

if $|c^{imaginary}|$ is less than $\gamma|c^{imaginary}|^{r/2}$, then value of said $P_{Signal\_imaginary}$ equals $P_{Signal\_imaginary}$ minus $\delta$;

if $|c^{imaginary}|$ is greater than or equal to $\gamma|c^{imaginary}|^{r/2}$, then value of said $P_{Signal\_imaginary}$ equals $P_{Signal\_imaginary}$ plus $\delta$;

whereby probabilities of said data comprising a signal are determined.

\* \* \* \* \*